United States Patent Office 3,644,646
Patented Feb. 22, 1972

3,644,646
NON-AQUEOUS LIQUID FORMULATIONS WITH BIOLOGICALLY ACTIVE INGREDIENTS
Bruno Sander and Heinrich Sperber, Ludwigshafen (Rhine), Germany, assignors to Badische Anilin- & Soda-Fabrik Aktiengesellschaft, Ludwigshafen (Rhine), Germany
No Drawing. Filed Aug. 19, 1968, Ser. No. 753,749
Claims priority, application Germany, Aug. 24, 1967,
P 16 42 229.0
Int. Cl. A01n 9/00, 9/20, 9/32
U.S. Cl. 424—325
9 Claims

ABSTRACT OF THE DISCLOSURE

New non-aqueous liquid compositions containing biologically active ingredients and cyclic di- or triethers, and their use for controlling pests.

---

This invention relates to new and valuable non-aqueous liquid compositions containing biologically active ingredients and cyclic di- or triethers, and methods of controlling pests using said compositions.

It is known that biologically active agents, e.g. substances having fungicidal or insecticidal action, can be dissolved in hydrocarbons and the solutions used for pest control. A disadvantage of the solutions is their strong odor which is due to the crude hydrocarbon mixtures used. It is also known that biologically active agents can be dissolved in water-miscible liquids, e.g. polyalkylene oxides or adducts of ethylene oxide to long-chain alcohols or phenols. These solutions have the disadvantage of being extremely sensitive to moisture, because a small content of water in the solvent greatly reduces the solvency for the active agents.

It is an object of the present invention to provide non-aqueous liquid formulations which contain biologically active ingredients and have a high solvent power for the said ingredients both in the dry state and in the presence of small amounts of water. Another object of the invention is to provide a method of controlling pests using new non-aqueous liquid formulations from which the active ingredients are not precipitated even when small amounts of water are present.

These and other objects and advantages of the invention are achieved by non-aqueous liquid pest control formulations (other than binders for wood-base materials) which, in addition to glycol or polyglycol ethers and biologically active ingredients, contain cyclic di- or triethers.

Cyclic di- or triethers for the purposes of the present invention are heterocyclic compounds which contain two or three oxygen atoms as the only hetero atoms in the heterocyclic ring. Such compounds are for example cyclic acetals of diols. These acetals may be substituted or unsubstituted, those containing five to eight ring atoms being preferred. 1,3-dioxolane, 1,3-dioxane, glycerol formal, butanediol-1,4-formal, butanediol-1,4-acetal, butene-2-diol-1,4-formal, butyne-2-diol-1,4-formal and the like are particularly suitable.

Cyclic di- or triethers also include trioxanes of the general formula

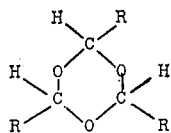

where R is hydrogen or a methyl, ethyl, propyl or phenyl group. Examples of trioxanes of this type are trioxymethylene, paraldehyde and reaction products of formaldehyde with acetaldehyde.

Other cyclic di- or triethers are 1,4-dioxanes, i.e. 1,4-dioxane itself and its derivatives containing methyl, ethyl, propyl or phenyl groups.

Obviously, mixtures of cyclic di- or triethers with each other may also be used.

Glycol or polyglycol ethers are understood to mean glycols or polyglycols in which one or two hydroxyl H ions have been replaced by alkyls, e.g. ethylene glycol monomethyl ether, ethylene glycol monoethyl ether and diethylene glycol monomethyl ether.

Of the biologically active ingredients those having insecticidal or fungicidal activity are of particular interest, e.g. salts of N-nitroso-N-organyl hydroxylamine, such as the calcium salt of N-nitroso-N-cyclohexyl hydroxylamine, and also pentachlorophenol or salts thereof, particularly pentachlorophenyl sodium, hexachlorocyclohexane and thiophosphoric esters.

The ratio by weight of glycol or polyglycol ether to cyclic di- or triether in the formulations is not critical and can be varied within wide limits, for example between 1:10 and 10:1 parts by weight. A ratio by weight of 5:3 has proved particularly satisfactory.

The formulations of the invention are odorless and unaffected by a small content of water. The absence of any odor is a great advantage, because any smell is very troublesome during application of the formulations. Technical grade materials having a low water content are usually employed for the preparation of the formulations. This water content has no troublesome effect in the case of formulations of the invention. In contrast, the manufacture from absolutely dry materials of conventional compounds which are senstive to small amounts of water involves considerable difficulty in practice.

The formulations of the invention are suitable for all applications where a non-aqueous solution of biologically active ingredients is to be used. They may for example be used as additives to paints with or without a content of pigment, or as additives to impregnating agents for protection of the paints or impregnating agents, or of the materials to be treated therewith, from attack by pests.

The formulations of the invention may for example have the following composition:

Formulation 1

5 parts ethylene glycol monomethyl ether
3 parts 1,3-dioxolane
2 parts of the calcium salt of N-nitroso-N-cyclohexyl hydroxylamine Formulation 2

5 parts ethylene glycol monoethyl ether
3 parts 1,3-dioxolane
2 parts pentachlorophenol sodium Formulation 3

6 parts ethylene glycol monomethyl ether
3 parts trioxane
1 part of the calcium salt of N-nitroso-N-cyclohexyl hydroxylamine Formulation 4

5 parts ethylene glycol monomethyl ether
3 parts trioxane
2 parts hexachlorocyclohexane Formulation 5

6 parts ethylene glycol monomethyl ether
3 parts 1,4-dioxane
1 part of the calcium salt of N-nitroso-N-cyclohexyl hydroxylamine

Formulation 6

6 parts ethylene glycol monomethyl ether
1.5 parts trioxane
1.5 parts 1,3-dioxolane
1 part pentachlorophenol

Formulation 7

5 parts ethylene glycol monomethyl ether
2 parts 1,3-dioxolane
2 parts hexachlorocyclohexane
1 part of the calcium salt of N-nitroso-N-cyclohexyl hydroxylamine The following examples illustrate the valuable properties of the formulations, but the invention is not restricted to these examples. The parts and percentages specified are by weight.

EXAMPLE 1

(a) Commercial non-aqueous liquid formulations for use in pest control which contain pentachlorophenol or pentachlorophenol sodium as biologically active ingredients and crude hydrocarbon mixtures (Coal-tar oil or mineral oil fractions) as solvents have an unpleasant and highly troublesome odor.

(b) The above formulations 1 to 7 on the other hand have a hardly noticeable smell or are almost odorless.

EXAMPLE 2

(a) Water is slowly added with intense stirring to a mixture of 58 parts of ethylene glycol monomethyl ether, 30 parts of 1,3-dioxolane and 12 parts of the calcium salt of N-nitroso-N-cyclohexyl hydroxylamine. The calcium salt (fungicide) is not precipitated until 16.9 parts of water has been added.

(b) Water is slowly added with intense stirring to a mixture of 58 parts of ethylene glycol monomethyl ether, 30 parts of an oxyethylation product of alkyl-substituted phenols or resin acids and 12 parts of the calcium salt of N-nitroso-N-cyclohexyl hydroxylamine. The calcium salt precipitates after as little as 4.7 parts of water has been added.

EXAMPLE 3

For preparing a fungicidal formulation a calcium salt of N-nitroso-N-cyclohexyl hydroxylamine is used which contains 2.8% water as residual moisture.

(a) 5 parts ethylene glycol monomethyl ether, 3 parts 1,3-dioxolane and 2 parts of the calcium salt of N-nitroso-N-cyclohexyl hydroxylamine can be combined to form a homogeneous mixture. The calcium salt (fungicide) is completely dissolved.

(b) 5 parts ethylene glycol monomethyl ether, 3 parts of an oxyethylation product of an alkyl-substituted phenol or resin acid and 2 parts of the calcium salt of N-nitroso-N-cyclohexyl hydroxylamine cannot be made into a homogeneous mixture. The calcium salt remains largely undissolved.

What we claim is:

1. A non-aqueous liquid pesticide formulation comprising a fungicidal or insecticidal effective amount of a pesticide selected from the group consisting of the calcium salt of N - nitroso - N - cyclohexyl hydroxylamine, pentachlorophenol, the sodium salt of pentachlorophenol, and hexachlorocyclohexane dissolved in a liquid medium consisting essentially of 1:10 to 10:1 parts by weight of (a) a member selected from the group consisting of ethylene glycol monomethyl ether, ethylene glycol monoethyl ether and diethylene glycol monomethyl ether and (b) a member selected from the group consisting of 1,3-dioxolane, 1,3-dioxane, glycerol formal, butanediol-1,4-formal, butanediol - 1,4 - acetal, butene-2-diol-1,4-formal, butyne-2-diol-1,4-formal, a trioxane of the formula

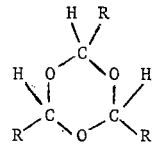

where R is hydrogen, methyl, etheyl, propyl or phenyl, 1,4-dioxane and mixtures thereof.

2. A non-aqueous formulation as claimed in claim 1 wherein component (a) is ethylene glycol monomethyl ether and component (b) is 1,3-dioxolane.

3. A non-aqueous formulation as claimed in claim 2 wherein said pesticide is the calcium salt of N-nitroso-N-cyclohexyl hydroxylamine.

4. A non-aqueous formulation as claimed in claim 2 wherein said pesticide is pentachlorophenol.

5. A non-aqueous formulation as claimed in claim 2 wherein said pesticide is hexachlorocyclohexane.

6. A non-aqueous formulation as claimed in claim 1 wherein component (a) is ethylene glycol monomethyl ether and component (b) is trioxane.

7. A non-aqueous formulation as claimed in claim 6 wherein said pesticide is the calcium salt of N-nitroso-N-cyclohexyl hydroxylamine.

8. A non-aqueous formulation as claimed in claim 6 wherein said pesticide is pentachlorophenol.

9. A non-aqueous formulation as claimed in claim 6 wherein said pesticide is hexachlorocyclohexane.

References Cited

UNITED STATES PATENTS 2,503,915   4/1950   Majewski _____ 167—42

OTHER REFERENCES

OSRD No. 6226 publication, November 1945, p. 3.
Jones et al., "Solvents for DDT," Soap and Sanitary Chemicals, pp. 110–115 and 155, November 1945.

JEROME D. GOLDBERG, Primary Examiner

A. J. ROBINSON, Assistant Examiner

U.S. Cl. X.R.

424—278, 342, 347, 350, 358